UNITED STATES PATENT OFFICE.

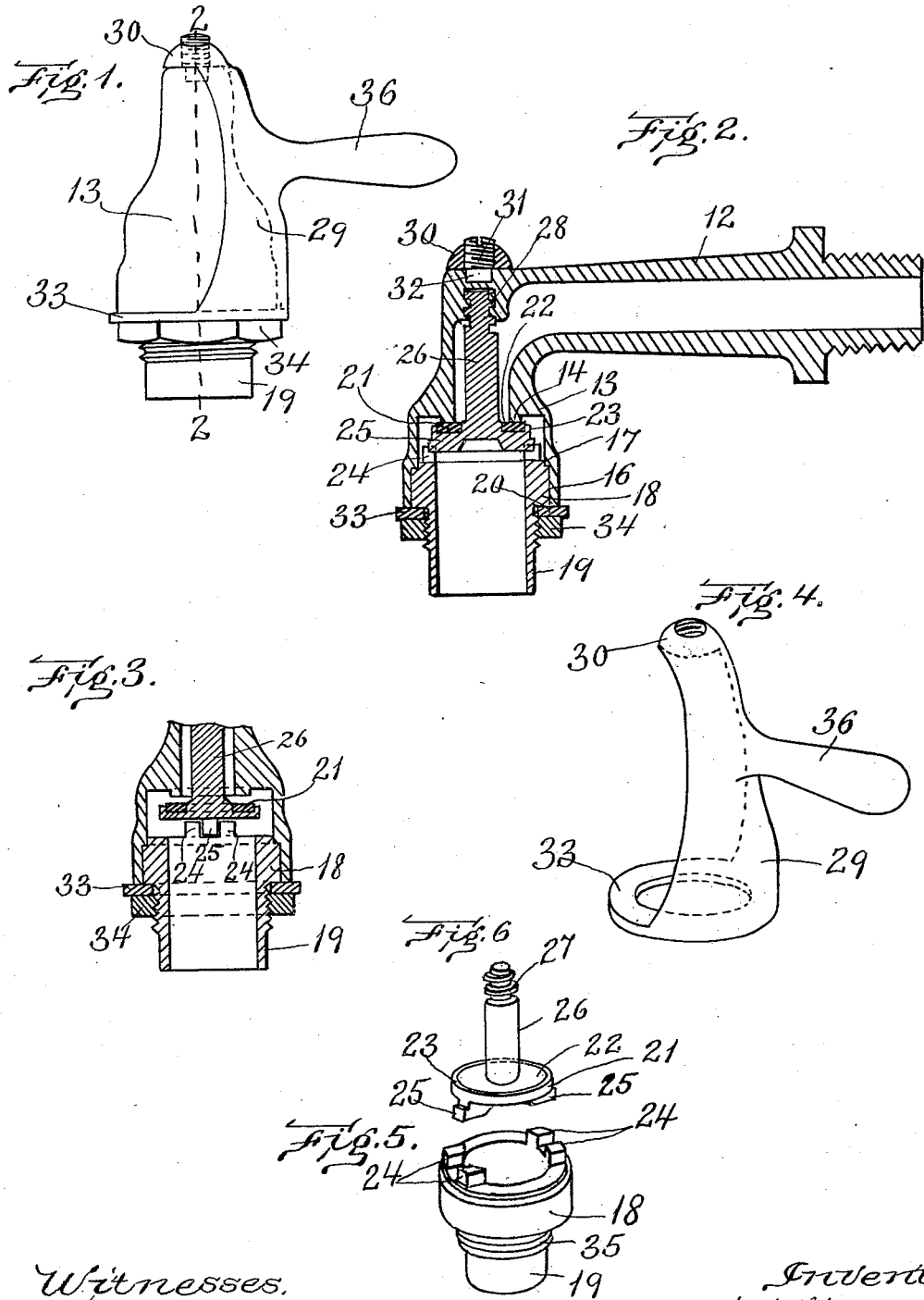

WASHINGTON H. KILBOURN, OF GREENFIELD, MASSACHUSETTS.

FAUCET.

955,272.  Specification of Letters Patent.  Patented Apr. 19, 1910.

Application filed May 6, 1909. Serial No. 494,496.

*To all whom it may concern:*

Be it known that I, WASHINGTON H. KILBOURN, of Greenfield, in the county of Franklin and State of Massachusetts, have invented certain new and useful Improvements in Faucets, of which the following is a specification.

This invention relates to a faucet which comprises a body portion or casing, an outlet nozzle rotatively engaged with the casing, and a valve having a sliding engagement with the nozzle, and an adjusting connection with the casing of such nature that the rotation of the valve by the nozzle will cause a movement of the valve toward and from its seat.

The invention has for its object to provide a simple and durable faucet embodying the construction above indicated, the number of parts of which is reduced to the minimum, said parts being adapted to be quickly and conveniently assembled and disconnected.

The invention consists in the improvements which I will now proceed to describe and claim.

Of the accompanying drawings, forming a part of this specification,—Figure 1 represents an end elevation of a faucet embodying my invention. Fig. 2 represents a section on line 2—2 of Fig. 1, the faucet being closed. Fig. 3 represents a view similar to a portion of Fig. 2, showing the faucet opened. Fig. 4 represents a perspective view of the nozzle securing an operating member removed from the faucet. Fig. 5 represents a perspective view of the outlet nozzle. Fig. 6 represents a perspective view of the valve.

The same reference characters indicate the same parts in all the figures.

In the embodiment of my invention here shown for purposes of illustration, the faucet casing or body is composed preferably of a single piece which includes the inlet portion 12, and the outlet portion 13, said portions being preferably angularly arranged relatively to each other, as shown in Fig. 2. The outlet portion 13 is provided with an enlarged circular cavity, the inner end of which has a valve seat 14 and constitutes a valve chamber 15, while the outer portion is preferably of larger diameter than the valve chamber and constitutes a bearing 16 in which the outlet nozzle, hereinafter described, is closely fitted and adapted to rotate, a shoulder 17 being provided at the inner end of the bearing on which the inner end of the outlet nozzle bears. The outlet nozzle is of tubular form, and has a thickened inner end portion 18 fitted to rotate in the bearing 16, and to bear against the shoulder 17, and a reduced outer end portion 19 which projects from the casing, a shoulder 20 being formed between the portions 18 and 19.

21 represents the valve, which is preferably provided with a compressible washer 22 adapted to be pressed against the valve seat 14, the valve having a rigid body portion which includes a marginal flange or curb 23 surrounding the washer 22. The valve and nozzle are provided with complemental coupling members adapted to maintain a rotative and a sliding connection between the said parts, so that when the nozzle is rotated, the valve will also be rotated, the valve being additionally movable toward and from the seat 14.

In the embodiment of my invention here shown, the sliding and rotative connection between the nozzle and the valve is provided by ears 24 on the inner end of the nozzle, and wings 25 formed on the under side of the valve, and adapted to have a sliding fit between the ears 24. The valve is so connected with the casing that its rotation will cause a movement of the valve toward or from its seat, the preferred connection being a stem 26 on the valve having a screw thread 27 at its outer end, and an internally screw threaded socket 28 formed in the casing and arranged to engage the screw threaded portion of the stem 26. The nozzle is detachably secured to the casing by means of an external member which also serves to rotate the nozzle, said member having a pivotal connection with the casing and a rigid connection with the nozzle. The said member is preferably a yoke 29 of the general form illustrated in Figs. 1 and 4, said yoke having at one end an arm 30 in which is an internally threaded orifice adapted to receive a screw threaded pivot stud 31 which enters a socket 32 formed for its reception in the casing, said socket being in alinement with the valve stem. The opposite end of the yoke is provided with an annular seat 33 which bears on the shoulder 20 of the outlet nozzle, and is rigidly clamped against said shoulder by a nut 34 engaged with a screw thread 35 on the reduced portion of the nozzle. The yoke is provided with an operating handle 36.

It will be seen that by swinging the yoke relatively to the casing, the nozzle may be partially rotated, and that the rotation of the nozzle imparted to the valve causes the latter to move toward or from its seat, thus opening or closing the faucet. In Fig. 2, the nozzle and valve are shown in the relative positions they occupy when the faucet is closed, while in Fig. 3, the nozzle and valve are shown when the nozzle has been given a partial rotation from the position shown in Fig. 2 in the direction required to partially withdraw the threaded portion of the valve stem from its socket and separate the valve from its seat, the wings 25 of the valve at the same time sliding downwardly between the ears 24 on the nozzle.

The removability of the pivot 31 and of the nut 34 permit the ready removal of the yoke 29 from the casing and from the outlet nozzle, the pivot 31 being first removed, after which the removal of the nut 34 will permit the upper end of the yoke to be swung away from the portion of the casing on which it bears far enough to permit the removal of the annular seat 33 from the nozzle. This operation releases the nozzle, which may be freely withdrawn from the casing, after which the valve may be also withdrawn by rotating it out of engagement with the screw threaded socket. The bearing 16 is of greater diameter than the valve chamber, and the outlet valve is secured to the casing wholly by the yoke 29, so that upon the removal of the yoke the nozzle and valve may be successively removed.

It will be seen that the described construction permits the casing of the valve to be made as a single piece or part, and that the device which rotates the outlet nozzle and valve also serves to secure the nozzle to the casing. The number of parts required is therefore considerably less than in faucets of this character heretofore used.

It is obvious that various changes may be made in the details of construction, without departing from the nature and spirit of the invention.

I claim:

1. A faucet comprising a casing having an enlarged cavity at its delivering end forming a valve chamber, and a bearing, an outlet nozzle and a valve slidingly connected, and located respectively in said bearing and chamber, the valve and casing being connected by means which cause movements of the valve toward and from its seat when the valve and nozzle are rotated, and a nozzle-confining and operating member detachably engaged with external portions of the casing and nozzle.

2. A faucet comprising a casing having at its delivering end a circular cavity, the inner end portion of which constitutes a valve chamber having a valve seat, while the outer end portion constitutes a bearing, an outlet nozzle journaled in said bearing, a valve rotatable in the chamber and having a screw thread connection with the casing and a sliding connection with the nozzle, the nozzle and valve being insertible and removable through the mouth of the cavity, and a nozzle-confining and operating member detachably engaged with external portions of the casing and nozzle.

3. A faucet comprising a casing having an enlarged cavity at its delivering end forming a valve chamber and a bearing, an outlet nozzle and a valve slidingly connected, and located respectively in said bearing and chamber, the valve and casing being connected by means which cause movements of the valve toward and from its seat when the valve and nozzle are rotated, and an external yoke pivoted to and supported by the casing and rigidly engaged with the nozzle.

4. A faucet comprising a casing having an enlarged cavity at its delivering end forming a valve chamber and a bearing, an outlet nozzle and a valve slidingly connected, and located respectively in said bearing and chamber, the valve and casing being connected by means which cause movements of the valve toward and from its seat when the valve and nozzle are rotated, and an external yoke detachably pivoted at one end to the casing, and detachably clamped at its opposite end to the nozzle.

5. A faucet comprising a casing having an enlarged cavity at its delivering end forming a valve chamber and a bearing, an outlet nozzle and a valve slidingly connected, and located respectively in said bearing and chamber, the valve and casing being connected by means which cause movements of the valve toward and from its seat when the valve and nozzle are rotated, and an external yoke having at one end an arm which is detachably pivoted to the casing, and at its opposite end an annular seat which is detachably clamped to the nozzle.

In testimony whereof I have affixed my signature, in presence of two witnesses.

WASHINGTON H. KILBOURN.

Witnesses:
MAYOLYN CUTLER,
RAYMOND A. BIDWELL.